United States Patent
Leschinger et al.

(10) Patent No.: US 6,182,846 B1
(45) Date of Patent: Feb. 6, 2001

(54) PEDESTAL CLOSURE ASSEMBLY WITH LOCKING MECHANISM

(75) Inventors: Matthew Leschinger, Wheaton; Lawrence Santo Dolan, Carol Stream; Thomas Potosnak, Streamwood, all of IL (US)

(73) Assignee: Marconi Communications Inc., Cleveland, OH (US)

( * ) Notice: Under 35 U.S.C. 154(b), the term of this patent shall be extended for 0 days.

(21) Appl. No.: 09/397,441

(22) Filed: Sep. 15, 1999

(51) Int. Cl.$^7$ .................................................. H02G 9/00
(52) U.S. Cl. .................. 220/4.02; 220/4.26; 220/475; 174/37
(58) Field of Search ................ 220/4.02, 4.21, 220/4.26, 475, 3.8; 174/37

(56) References Cited

U.S. PATENT DOCUMENTS

| | | | |
|---|---|---|---|
| 2,601,056 | * 6/1952 | Rapisarda | 220/475 X |
| 3,375,620 | * 4/1968 | Phillips | 220/475 X |
| 3,485,408 | * 12/1969 | Benesch | 220/4.26 |
| 3,812,279 | 5/1974 | Voegeli . | |
| 3,854,532 | 12/1974 | Martinelli . | |
| 3,858,755 | 1/1975 | Tellen . | |
| 3,872,234 | 3/1975 | Smith . | |
| 3,928,713 | * 12/1975 | Davis | 220/475 X |
| 3,952,908 | 4/1976 | Carson . | |
| 4,005,253 | 1/1977 | Walter . | |
| 4,326,395 | 4/1982 | DeRosa . | |
| 4,365,108 | 12/1982 | Bright . | |
| 4,892,978 | 1/1990 | Axworthy . | |
| 5,055,636 | 10/1991 | Jaycox . | |
| 5,059,748 | 10/1991 | Allen et al. . | |
| 5,308,923 | 5/1994 | Puigcerver et al. . | |
| 5,669,522 | * 9/1997 | Million et al. | 220/4.02 |
| 5,777,268 | 7/1998 | Allen et al. . | |

* cited by examiner

*Primary Examiner*—Steven Pollard
(74) *Attorney, Agent, or Firm*—Jones, Day, Reavis & Pogue

(57) ABSTRACT

A pedestal closure assembly has an upper housing section and a separate lower housing section, each of which include front walls, rear walls, and two side walls. These housing sections are structured and dimensioned for telescoping nesting with first and second positive locking mechanisms for a friction fit. These housing sections when locked together form an integral housing structure which has an interior space for protectively accommodating electrical, power supply or telecommunications equipment. This housing structure may be constructed of non-metallic material. The first positive locking mechanism and second locking mechanism may be positioned across from each other on opposite side walls of the housing sections, and, even more preferably, may be aligned diagonally from each other on opposite side walls of the housing sections. The lower housing section may include raised ribs to enhance the friction fit of the assembled housing sections.

10 Claims, 8 Drawing Sheets

PEDESTAL CLOSURE ASSEMBLY WITH LOCKING MECHANISM

BACKGROUND OF THE INVENTION

1. Field of the Invention

The present invention relates to pedestal closure assemblies for storing power and telecommunications equipment, and more particularly to pedestal closure assemblies having upper and lower housing sections fastened together with locking mechanisms configured to keep the sections securely connected and to allow for access to the internal equipment, and for easy and secure manual assembly and disassembly.

2. Description of the Related Art

Telecommunications, cable television, power distribution equipment and the like, including primary cable loops, terminal blocks, and connections between a primary cable loop and a terminal block are commonly located out-of-plant and subject to ambient weather conditions. Since the necessary equipment is located outside, a protective covering is required to safeguard the equipment from human interference as well as from the environment. Therefore, such protective covering must provide structural as well as environmental protection.

Typically, the protective covering is produced in the form of a pedestal. The pedestal structure includes a housing with a sufficient volume occupying a small area and placeable in a convenient working orientation for housing the aforementioned equipment. Inside the housing, cable pairs may be interconnected to each other. Such interconnections are made at a connector block which is mounted to a universal mounting plate inside the pedestal closure assembly. The connector block includes a number of terminals, and the pairs of wires in the cable are stripped of their insulation and connected to the terminals.

A base section of the closure housing is recessed and secured in the ground, and has a passageway to permit underground cables to extend therethrough. The cables extend through the base section and are covered by a top section of the housing which attaches to the base section. The pedestal closure assembly, when assembled and installed, should have sufficient structural strength to resist minor impacts as well as other environmental conditions such as wind, snow accumulation or precipitation impact.

Presently, commercially available pedestal closure assemblies are primarily constructed of metal and the upper and lower sections are held together by, for example, positioning a clamping bracket around the lower section of the pedestal closure assembly, and then fitting the upper section of the housing over the lower section and fastening it to the clamping bracket by a bolting means or a bayonet-locking means.

Another technique previously used to assemble metallic upper and lower sections of a pedestal entails a screw-clamp method which requires positive location of a clamping means on the pedestal closure assembly. This can cause marring of the finish when the pedestal closure assembly is made of metal, thus causing rusting and corrosion after prolonged exposure to the elements. If the pedestal closure assembly is non-metallic, the pressure of the fasteners, due to their geometrical shape and small contact area, can lead to indenting or fracture of the pedestal closure assembly. Finally, if the fasteners are not sufficiently tightened, the position of the clamp may change causing the closure to become disassembled, especially in the presence of extreme physical and environmental impact, such as flood-level waters or deep snow.

Another technique involves the placing of screws in the lower housing section. The screws are then screwed radially toward the upper housing section of the pedestal closure assembly with opposing screws providing the locking action. This technique is not very efficient as the tightening of one of the screws may cause the other screws to become loose. With this technique, therefore, it is difficult for the installer to know if and when a tight fit has been made. Quite often, a chain is used as an additional restraining device to prevent the top and bottom sections from coming unlocked and apart.

U.S. Pat. No. 3,812,279 discloses a cable television housing with a lockably joined cover and base locked together by a rotatable shaft having an L-shaped keeper mounted on the cover that fits in a longitudinal opening in a bayonet opening in the base.

U.S. Pat. No. 3,854,582 discloses a container with a cover, with the container having locking L-shaped lugs and the cover having complementary slots to receive the lugs. The container and cover are rotatable so as to allow the lugs to be moved into and removed from the slots on the cover.

U.S. Pat. No. 3,858,755 discloses a meter box with a cover having a biased snap-lock. The locking member includes a cammed latch for engaging a flange on the box body; the locking member also includes a slightly flexible spring section.

U.S. Pat. No. 3,872,234 discloses an electrical cable pedestal structure with a top and bottom section connected by having bolts received in open end slots in each side wall of the bottom section in tandem with a stake for further support.

U.S. Pat. Nos. 3,952,908 and 4,065,020 disclose a meter box and two-part rotatably locking cover. The cover is locked into place by using three (3) selectively engaging flanges or protrusions and slots, with the flanges located on the cover and the slots positioned on the meter box.

U.S. Pat. No. 4,005,253 discloses a grade-level enclosure for electrical apparati with a cover and base section connected by a threaded tube and screw mechanism.

U.S. Pat. No. 4,326,395 discloses an electric enclosure locking assembly which consists of an attaching bolt that secures an adjustable bracket to the cover of the enclosure, a locking shield which overlies and prevents removal of the attaching bolt, and a removable lock bolt which secures the locking shield to the cover.

U.S. Pat. No. 4,365,108 discloses a secondary power pedestal with housing and cover sections that could be attached with either a padlock or other cooperating hasp and receptacle members, such as a threaded socket for a lock bolt.

U.S. Pat. No. 4,892,978 discloses self-supporting pedestal with a top cover and base unit kept together by inserting a pin through locking openings formed on locking ribs on the base unit and also through the associated locking openings formed on the channeled bosses of the top cover.

U.S. Pat. Nos. 5,055,636 and 5,235,134 disclose a sealed reenterable splice enclosure with a top and bottom section attached by a padlock and spline mechanism.

U.S. Pat. No. 5,059,748 discloses a cable splice enclosure with a base and domed cover that are attached by an O-ring and circular clamp mechanism.

U.S. Pat. No. 5,308,923 discloses an enclosure assembly that is mounted on telephone poles or exterior walls of buildings and the like with multiple latches and flanges integral with the cover section and base section of the assembly. A support bracket is apparently needed to secure the cover and base sections together when the assemble is attached to a pole or exterior wall and the like.

U.S. Pat. No. 5,777,268 discloses an environmentally sealed splice closure for buried telecommunications cables with a cap section and two base sections, base sections being connected by inserting locking pins into complementary slots on each base section, and cap section and base section being held together by base snap fingers received in cap finger slots.

In some instances, a traditional combination padlock is used to keep the upper and lower sections of the housing together. A closed hook is included on either the upper or lower section of the housing to engage the padlock. This method of locking tends to cause many problems, especially in inclement weather. Oftentimes, after a snow or freezing rain, the padlock is frozen such that the combination wheel cannot be turned. Even when a non-combination padlock is used, frozen water can get into the lock and prevent a key from opening the padlock.

Additionally, costs of fabricating metal pedestal closure assemblies are higher than for non-metallic ones. Furthermore, since metal pedestal closure assemblies are relatively heavy, it takes costly and time-consuming labor to install them correctly and to ensure that they do not begin to lean after installation and extended physical and environmental impact in a support medium.

BRIEF SUMMARY OF THE INVENTION

A general object of the present invention is to provide a pedestal closure assembly for containing, storing and protecting electronic, power supply and telecommunications equipment with a locking mechanism that keeps the contained equipment secure.

A more specific object of the present invention is to provide a pedestal closure assembly with a locking mechanism that allows for easy and quick opening and closing of the assembly.

In accordance with the present invention, as embodied and broadly described herein, these objects are achieved by providing a pedestal closure assembly having a housing with a lower section for implanting into a grounding medium such as concrete, earth and the like, and also having an upper section for releasably engaging the lower section. The housing, in turn, forms an interior chamber adapted to contain equipment. The pedestal closure assembly includes a first positive locking mechanism with a bolt and tamper-resistant washer connected to either the upper or lower housing sections, with a slot formed in the other housing section. A second positive locking mechanism is included. It has a flexible tab connected to one of the housing sections and an opening formed in the other housing sections whereby the housing sections may be easily engaged and disengaged.

One of the advantages of the pedestal closure assemblies having a locking mechanism constructed in accordance with the present invention is that the assembly is less prone to human and environmental interference as a result of its being kept more securely intact. An additional advantage is that the locking mechanism allows for easy and secure manual assembly and disassembly of the pedestal closure assembly.

Additional novel features and advantages of the invention will be set forth in part in the description that follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

DETAILED DESCRIPTION OF THE PREFERRED EMBODIMENT

While particular embodiments of the invention will be shown and described in detail below, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

Figure 1:
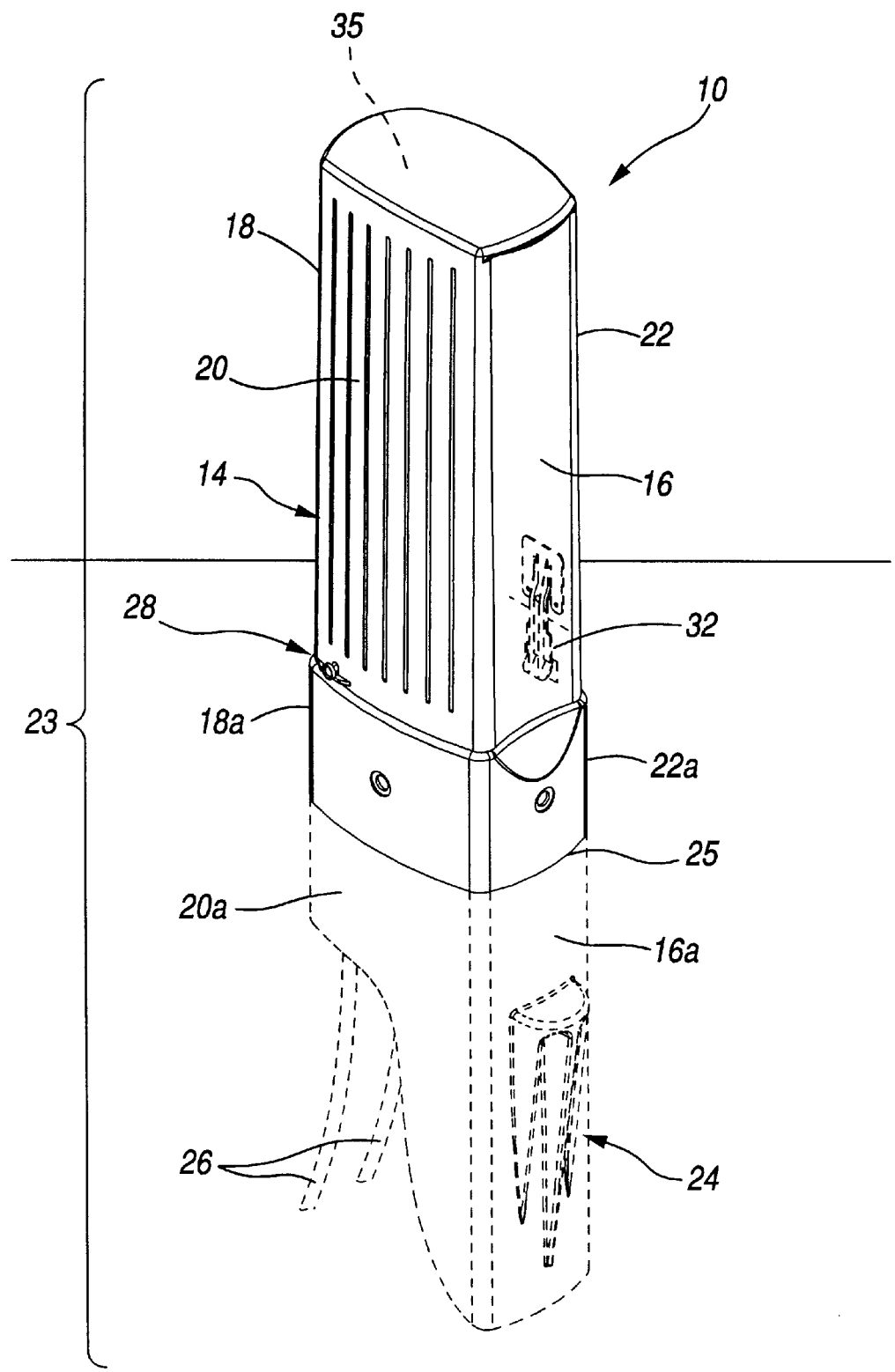
FIG. 1 is a perspective view of an assembled pedestal closure assembly of the present invention.

Referring now to the drawings, a pedestal closure assembly is generally designated by reference numeral 10 and includes an upper housing section 14 with a rear wall 16, a front wall 18, a side wall 20 and a side wall 22. As illustrated in FIG. 1, assembly 10 also includes a lower housing section 24 with a rear wall 16a, a front wall 18a, a side wall 20a and a side wall 22a. The upper housing section 14 and lower housing section 24 are structured and dimensioned for telescopingly nesting with a first positive locking mechanism 28 and a second positive locking mechanism 32 to engage upper housing section 14 and lower housing section 24 to form a housing structure 23 having an interior space 35 for protectively accommodating electrical, power supply or telecommunications equipment, and yet allowing easy and quick access to the equipment.

As further illustrated in FIG. 1, the pedestal closure assembly 10 is installed with the lower housing section 24 recessed into a pit or trench in the support medium 25, such as earth, clay, concrete or the like. For illustrative purposes, a buried multi-pair primary cable 26 is shown extending upwardly from below the pedestal closure assembly 10 through the lower housing section 24 into the housing structure 23.

Figure 2:
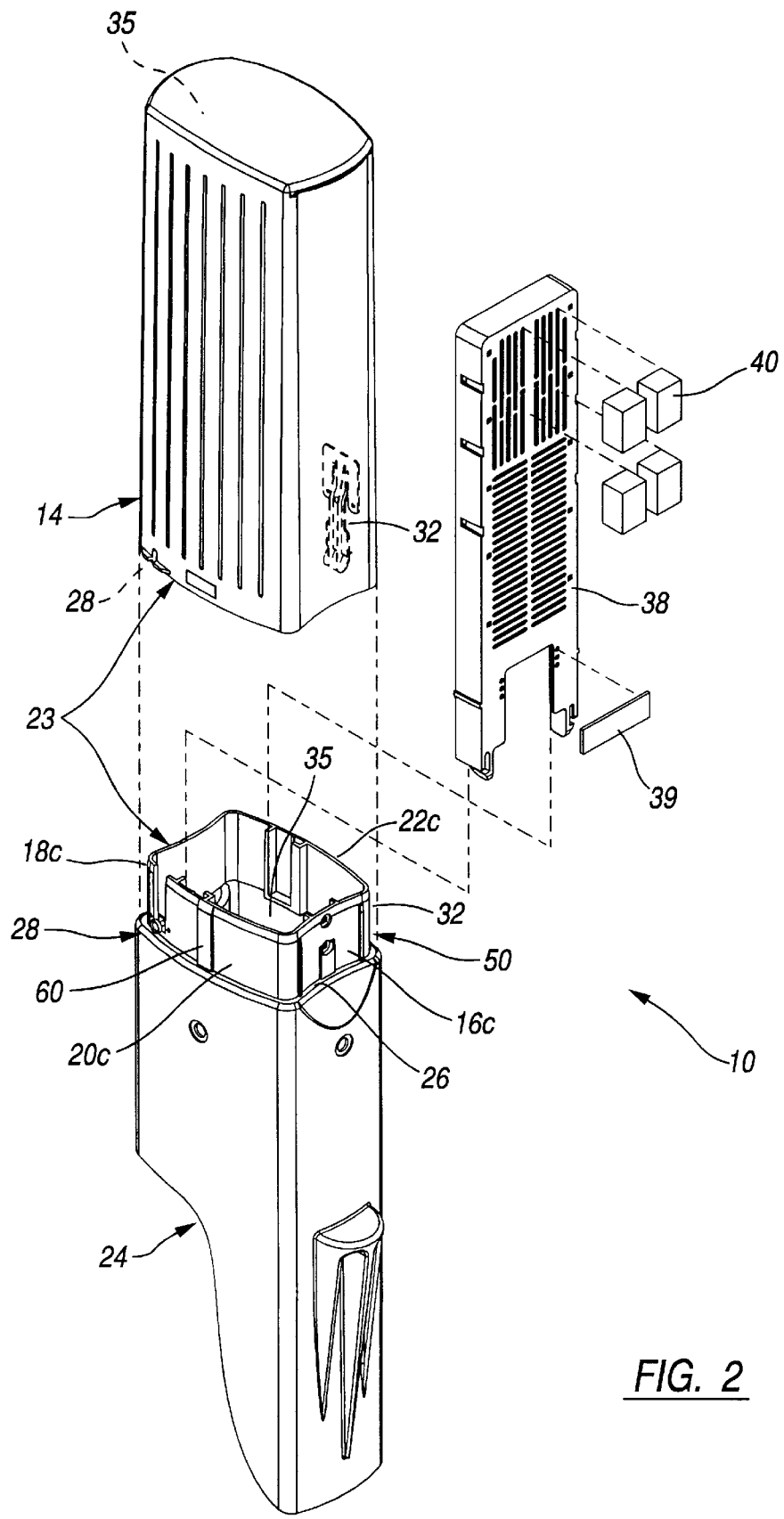
FIG. 2 is an exploded perspective view of the pedestal closure assembly as illustrated in FIG. 1.

With reference to the exploded view of the pedestal closure assembly 10 depicted in FIG. 2, electronic interconnection blocks, such as terminal blocks 40, as well as other electronic, power supply and telecommunications equipment and the like, may be retained within the enclosed interior space 35 defined by the housing structure 23 of the pedestal closure assembly 10. Also contained within the interior space 35 is a universal mounting plate 38 upon which one or more terminal blocks 40 and the like are mounted. Also affixed to the mounting plate 38 is a conductive metal grounding bracket 39 which enables the electrical equipment connected to the terminal blocks 40 to be electrically grounded.

FIG. 2 also shows the collar portion 50 of the lower housing section 24. The collar portion 50 includes a rear wall 16c, a front wall 18c, a side wall 20c and a side wall 22c that together define a housing structure with a smaller cross-section than the rest of the lower housing section 24. This configuration allows the upper housing section 14 and the lower housing section 24 to telescopingly nest to provide a secure friction fit for the assembled pedestal. In addition, flange 26 is shown to extend outward from the collar to allow for the upper housing section 14 to rest on the lower housing section 24 once the two sections are connected.

The first positive locking mechanism 28 and the second positive locking mechanism 32 are located opposite one another on collar 50 and upper housing section 14, respectively. In a preferred embodiment, the housing structure 23 is constructed of non-metallic material, such as high-density polyethylene, or, HDPE, and first positive locking mechanism 28 and second positive locking mechanism 32 are located diagonally from one another as shown in FIG. 2, with the first positive locking mechanism 28 located on side wall 20c or side wall 22c of collar portion 50 of the lower housing section 24, and second positive locking mechanism 32 located on opposite side wall 20 or opposite side wall 22 of upper housing section 14. In addition, the collar portion 50 includes raised ribs 60 which are structured and dimensioned to increase the friction fit between upper housing section 14 and lower housing section 24 and to contribute to the structural integrity of the engaged upper and lower housing sections.

Figure 3:
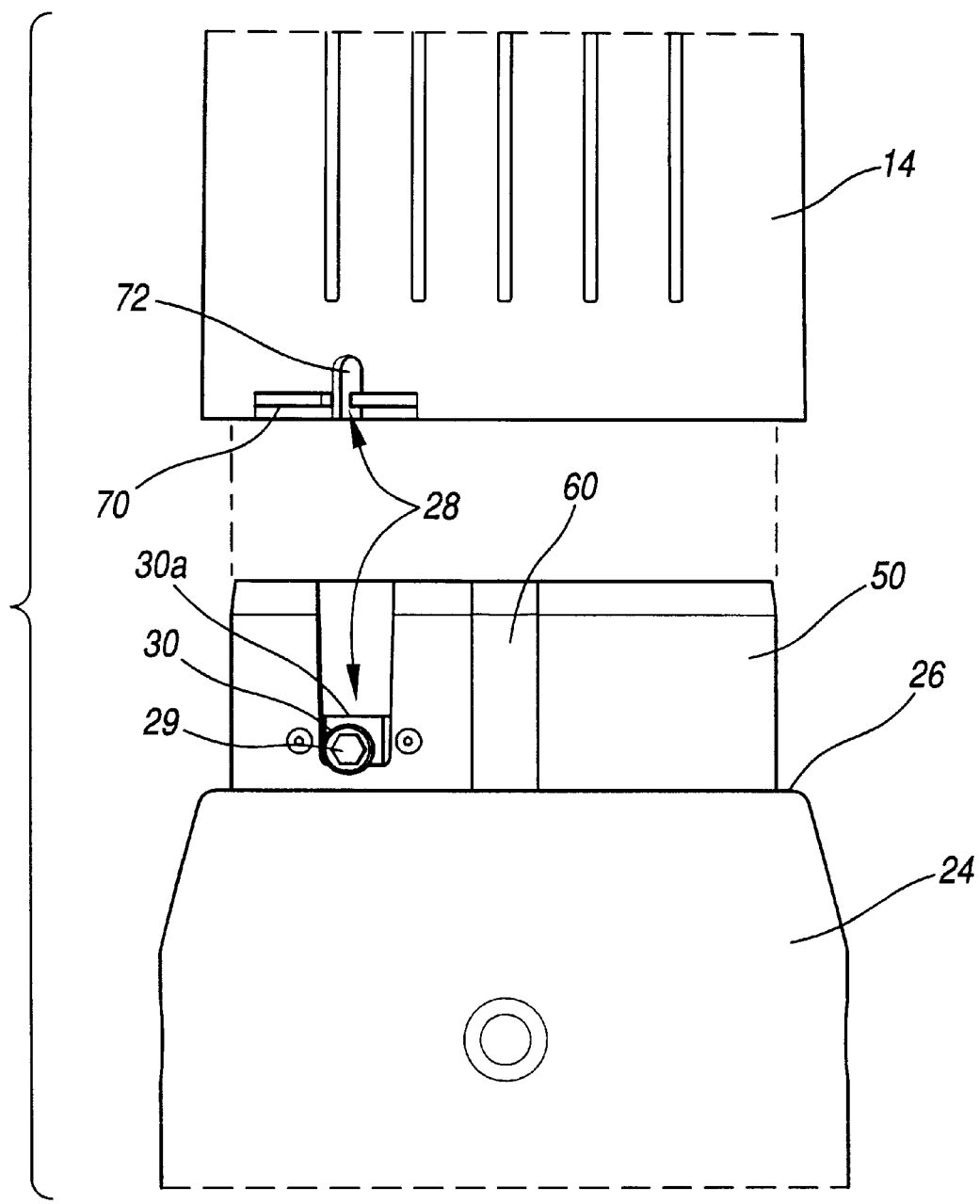
FIG. 3 is an enlarged partial side view of the upper and lower housing sections in a disengaged mode illustrating the first positive locking mechanism.
Figure 4:
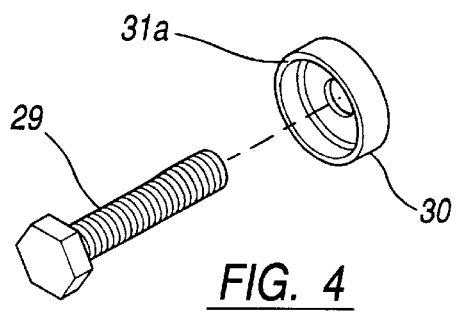
FIG. 4 is a perspective view of the bolt and tamper resistant washer portion of first locking mechanism.
Figure 5:
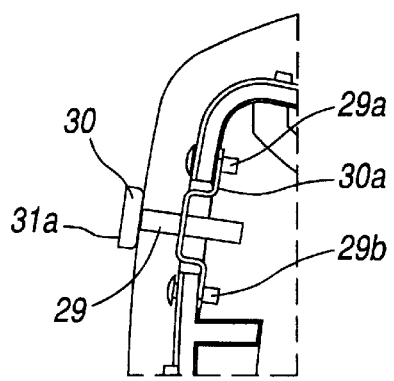
FIG. 5 is a partial top view of the first locking mechanism.
Figure 8:
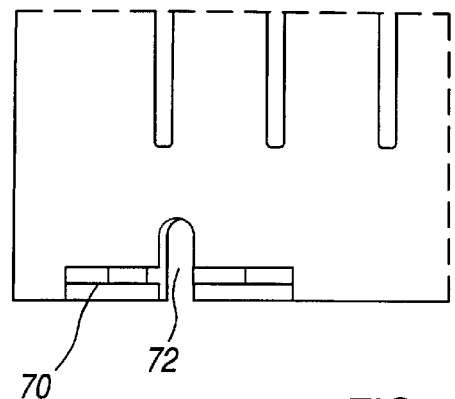
FIG. 8 is an elevational view of the slot associated with the first locking mechanism.
Figure 6:
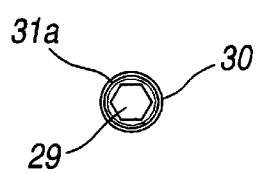
FIG. 6 is an elevational view of the bolt and tamper resistant washer portion of first locking mechanism.
Figure 9:
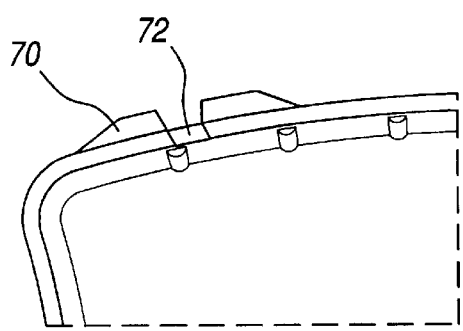
FIG. 9 is a bottom plan view of the slot associated with the first locking mechanism.
Figure 7:
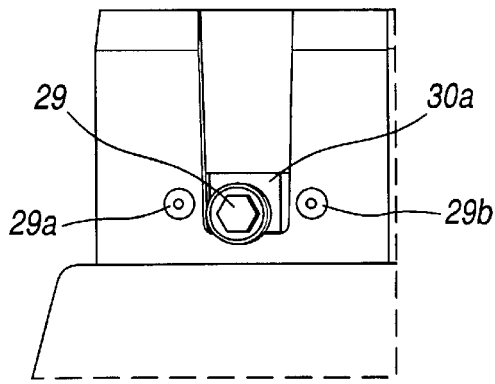
FIG. 7 is an elevational view of bracket portion of first locking mechanism.
Figure 10:
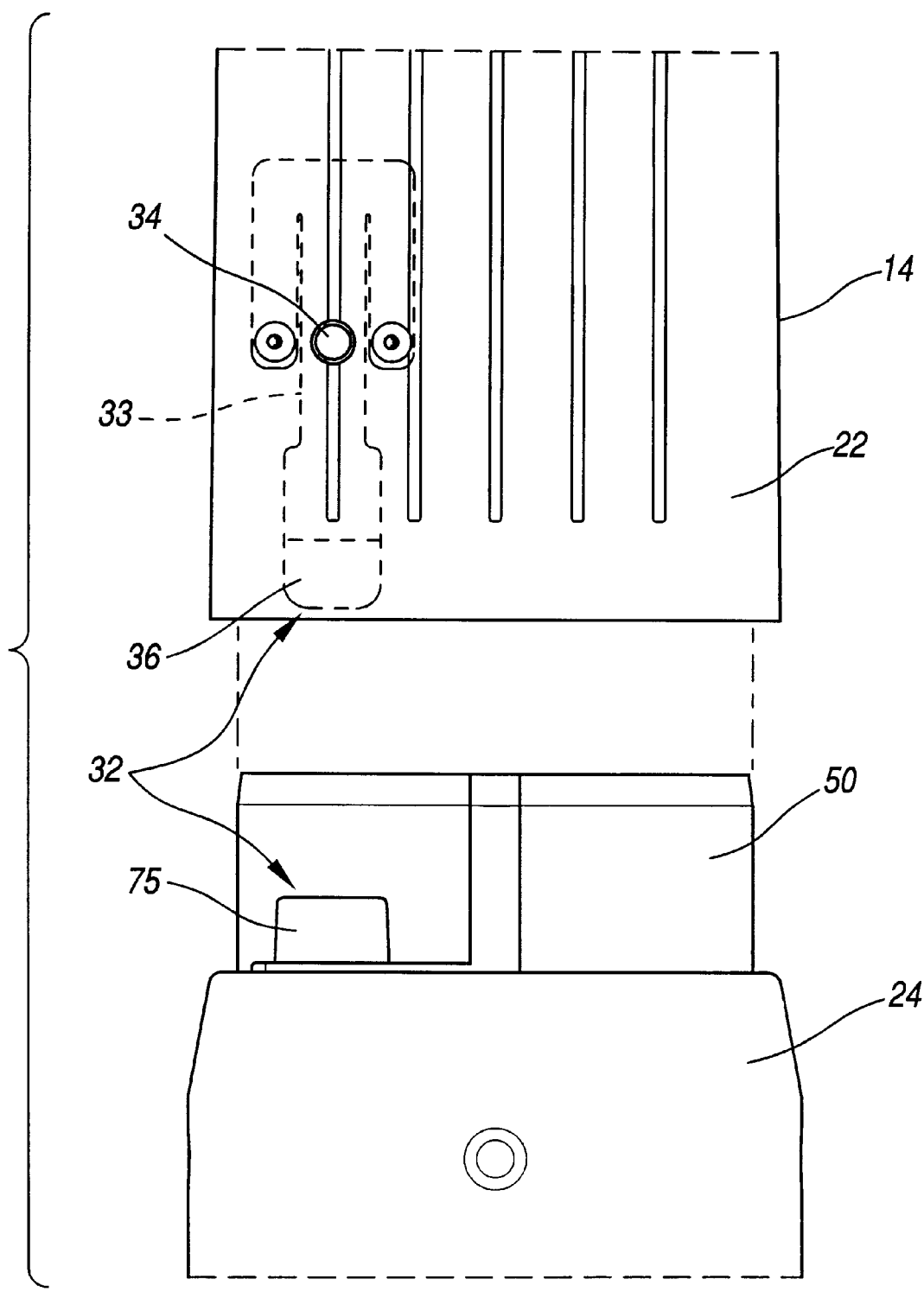
FIG. 10 is an elevational view of the disengaged sections illustrating the second positive locking mechanism.
Figure 11:
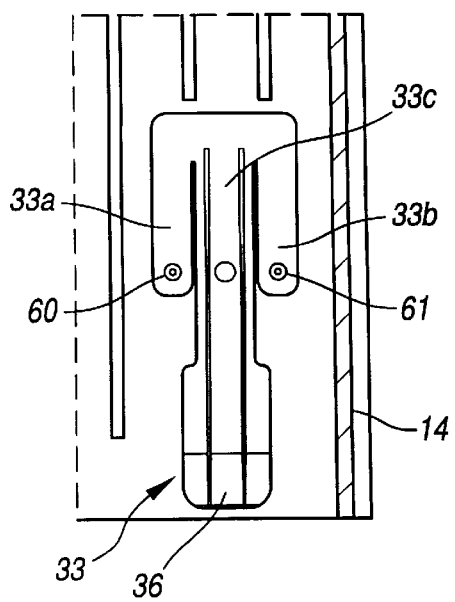
FIG. 11 is a front elevational view of the self-locking tab of the second positive locking mechanism.
Figures 13, 14, 15:
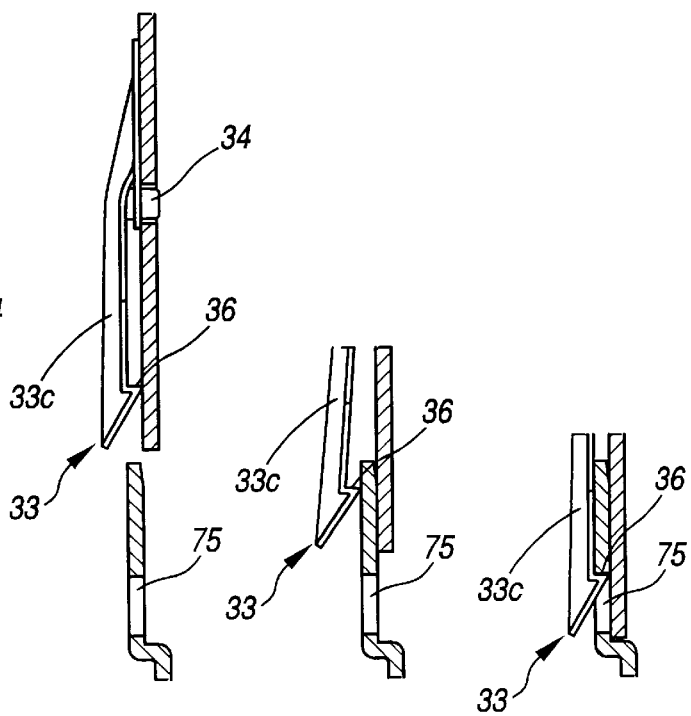
FIG. 13 is a side sectional view showing a disengaged second positive locking mechanism.
FIG. 14 is a side sectional view showing a partially engaged second positive locking mechanism.
FIG. 15 is a side sectional view showing a fully engaged second positive locking mechanism.
Figure 12:
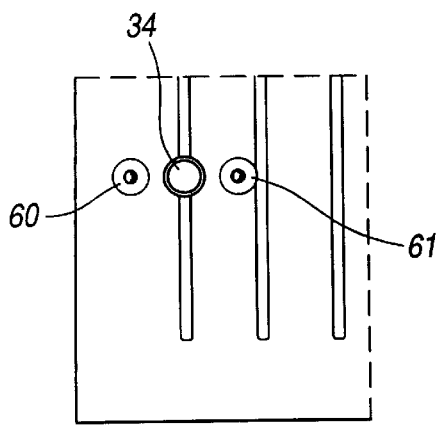
FIG. 12 is a rear elevational view of the self-locking tab of the second positive locking mechanism.
Figure 17:
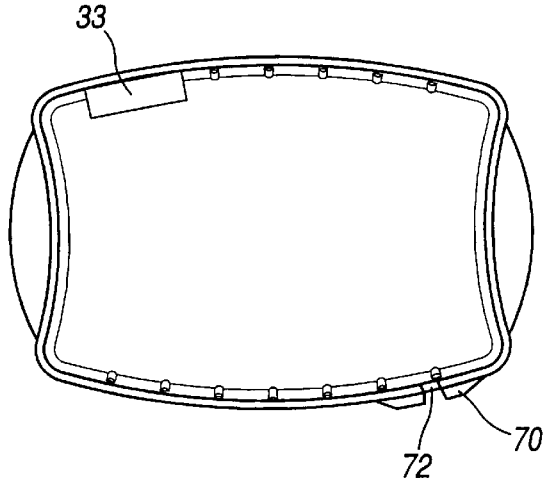
FIG. 17 is a bottom plan view of the upper housing section.

The first positive locking mechanism 28 is shown in detail in FIG. 3, and the bolt 29, bracket 30a and tamper-resistant washer 30 which make up locking mechanism 28 are shown in detail in FIGS. 4–6. FIGS. 3, 8, 9 and 19 show the lip 70 in the slot 72 in the upper housing section 14 under which first positive locking mechanism 28 is positioned in order to enhance the engagement of the upper housing section 14 and lower housing section 24. FIG. 7 shows bracket 30a of first positive locking mechanism 28 as attached to the pedestal housing by a pair of rivets 29a and 29b, and includes the bolt 29 and a rotatable, tamper-resistant washer 30. Washer 30 has an inwardly curved edge 31a in order to make manual disengagement of the first positive locking mechanism 28 nearly impossible without the correct tool, such as needle-nose pliers. This enhances the security features of the pedestal closure assembly being described and claimed herein. The bolt 29 and washer 30 are structured and dimensioned for capture in slot 72 of the upper housing section 14. Locking mechanism 28 can be adjusted by rotating the washer 30 clockwise for tightening and counter-clockwise for loosening with the appropriate tool, such as needle-nose pliers and the like.

The second positive locking mechanism 32 is shown in detail in FIGS. 10–16 and 18. In a preferred embodiment, flexible tab 33 is attached to the interior of a side wall of upper housing section 14 by rivet 60 and rivet 61, and has a release button 34 and an engaging section 36. Latch 33 has a side legs 33a and 33b with a longer center leg 33c. Side legs 33a and 33b are the same length, and are approximately 33% shorter than center leg 33c. Latch 33 is positioned and configured such that engaging section 36 engages the cut-out portion 75 located in the collar portion 50 of lower housing section 24 thereby engaging the upper housing section 14 and the lower housing section 24. Release button 34 extends through side wall 20 or 22 of the upper housing section 14 far enough to allow manual disengagement of the engaging section 36 from the cut-out portion 75 by pressing the release button 34 until the engaging section 36 disengages from the cut-out portion 75.

Figure 16:
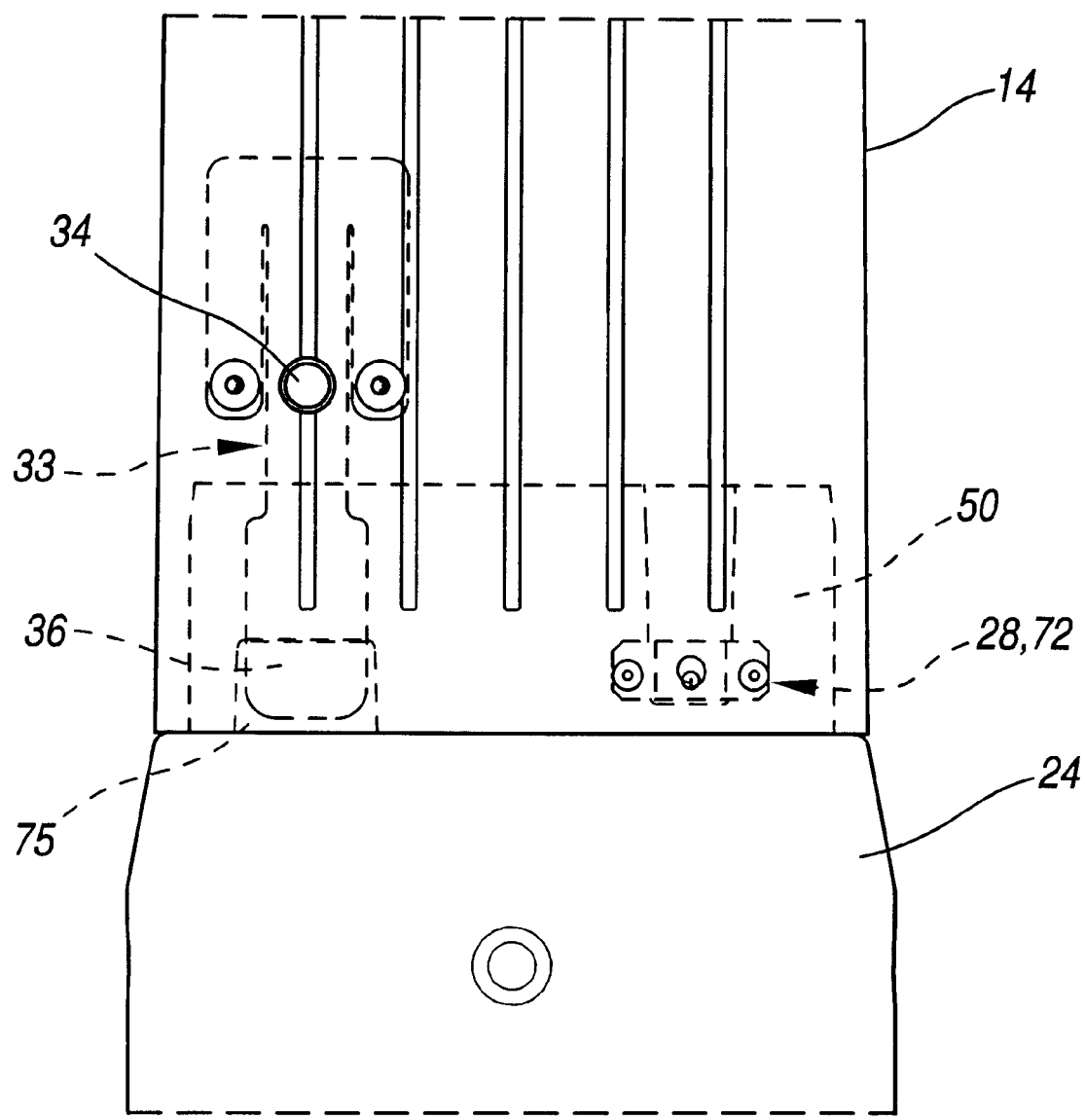
FIG. 16 is a cut-away view of the assembled housing showing the first and second positive locking mechanisms in locked position.
Figure 18:
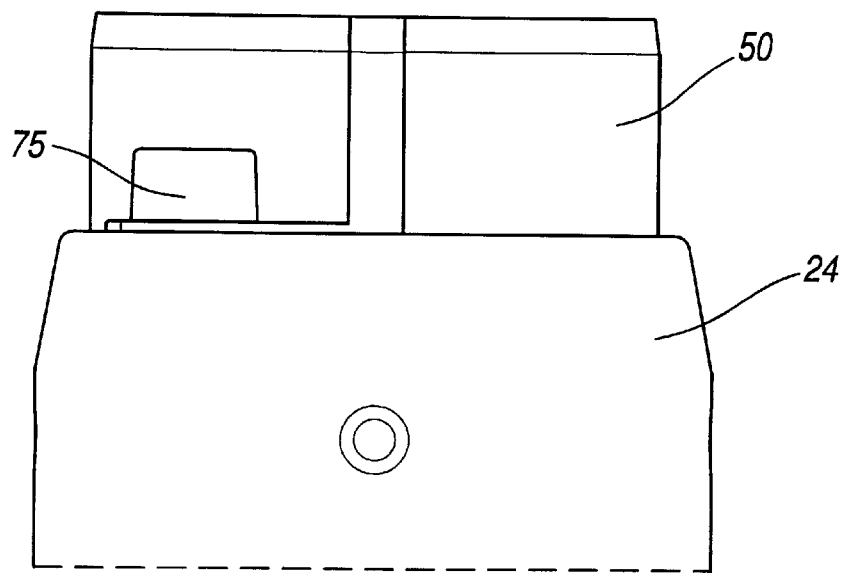
FIG. 18 is an elevational view of the cut-out portion of the second positive locking mechanism.
Figure 19:
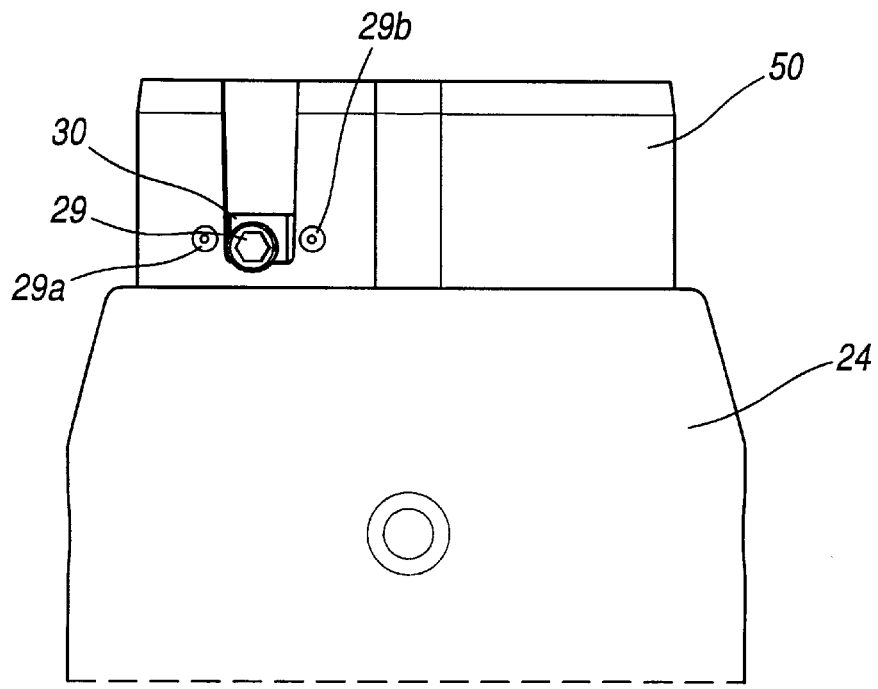
FIG. 19 is an elevational view of the first positive locking mechanism.

When both first positive locking mechanism 28 and second locking mechanism 32 are in the locked position, the friction fit is enabled by the telescoping nesting of the upper housing section 14 and the lower housing section 24 and further enhanced by the presence of the raised ribs 60. FIG. 16 shows the pedestal closure assembly 10 securely locked in accordance with the teachings of the present invention.

Alternatively, and still within the scope of the present invention, the housing structure can have a triangular, square, rectangular or circular cross-section. In addition, instead of plastic, the housing structure can be made of metal. Similarly, the first positive locking mechanism can be made of plastic, or some other durable non-metallic substance, and the second positive locking mechanism can be constructed of metal, or can be constructed of plastic and be formed integrally on the lower housing section, with a corresponding cut-out portion in the upper housing section. All of these changes would be within the scope of the invention as described above.

We claim:

1. A pedestal closure assembly comprising:
   a housing having a lower section for implanting in a grounding medium and an upper section for releasably engaging said lower section, said housing forming an interior chamber adapted to contain equipment;

a first positive locking mechanism including a bolt and tamper-resistant washer connected to one of said housing sections and a slot formed in the other of said housing sections; and a second positive locking mechanism including a flexible tab connected to one of said housing sections and an opening formed in the other of said housing sections whereby said housing sections may be easily engaged and disengaged.

2. The enclosure apparatus of claim 1 wherein said first positive locking mechanism is aligned diagonal to said second positive locking mechanism.

3. The enclosure apparatus of claim 1 wherein said housing is constructed of non-metallic material.

4. The enclosure apparatus of claim 1 wherein said second positive locking mechanism is integrally formed in the lower housing section and said cut-out portion is formed in the upper housing section.

5. The enclosure apparatus of claim 1 wherein said upper housing section includes a slot, and said lower housing section includes a collar portion having a front wall, rear wall and two side walls defining a housing cross-section that is reduced in size from a housing cross-section taken beneath said collar portion thereby allowing telescoping engagement of said upper and lower housing sections, one of said side walls including a cut-out portion.

6. The enclosure apparatus of claim 5 wherein said second positive locking mechanism is integrally formed in the collar portion of the lower housing section and said cut-out portion is formed in the upper housing sections.

7. The enclosure apparatus of claim 5 wherein said telescoping engagement provides a friction fit between said upper and lower housing sections that supplements said fixed interconnection.

8. The enclosure apparatus of claim 5 wherein said first positive locking mechanism further comprises a bolt and a tamper-resistant washer and said bolt and washer structured and dimensioned for capture in said slot, said fastener being adjustable by rotating said washer; and said second positive locking mechanism further comprises a flexible tab having a release button and an engaging portion, said latch provided on an interior surface of one of said side walls of said upper housing section and positioned and configured for engaging portion to engage said cut-out portion and thereby connecting said upper housing section to said lower housing section, said release button extending through one said side wall of said upper housing section so as to allow manual disengagement of said engaging portion from said cut-out portion.

9. The enclosure apparatus of claim 8 wherein said collar portion includes raised ribs structured and dimensioned to increase said friction fit between said upper and lower housing sections and to contribute to the structural integrity of said fixed interconnection.

10. The enclosure apparatus of claim 8 wherein said slot includes a lip under which said closure fastener means is positioned in order to enhance said fixed interconnection of said upper and lower housing sections.

* * * * *